United States Patent
Takeshima et al.

(10) Patent No.: US 8,961,922 B2
(45) Date of Patent: Feb. 24, 2015

(54) HYDROGEN PRODUCTION PROCESS

(75) Inventors: Shinichi Takeshima, Numazu (JP); Norihiko Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/996,147

(22) PCT Filed: Dec. 7, 2011

(86) PCT No.: PCT/JP2011/078845
§ 371 (c)(1),
(2), (4) Date: Aug. 14, 2013

(87) PCT Pub. No.: WO2012/090704
PCT Pub. Date: Jul. 5, 2012

(65) Prior Publication Data
US 2013/0330269 A1  Dec. 12, 2013

(30) Foreign Application Priority Data
Dec. 28, 2010 (JP) .................................. 2010-294085

(51) Int. Cl.
*C01B 3/02* (2006.01)
*C01B 3/06* (2006.01)
*C01B 17/50* (2006.01)

(52) U.S. Cl.
CPC ............... *C01B 3/068* (2013.01); *C01B 17/502* (2013.01); *C01B 17/503* (2013.01); *Y02E 60/36* (2013.01)
USPC ...................................................... 423/648.1

(58) Field of Classification Search
CPC ........................................................ C01B 3/042
USPC ...................................................... 423/648.1
See application file for complete search history.

(56) References Cited

U.S. PATENT DOCUMENTS

| 4,330,523 | A | 5/1982 | Brecher et al. |
| 7,543,456 | B2 * | 6/2009 | Sinha et al. .................. 62/238.6 |
| 2005/0000825 | A1 | 1/2005 | Nomura et al. |
| 2008/0286194 | A1 * | 11/2008 | Eriksson et al. ........... 423/594.8 |

FOREIGN PATENT DOCUMENTS

| JP | A-2005-41764 | 2/2005 |
| JP | A-2007-218604 | 8/2007 |

OTHER PUBLICATIONS

Kim et al., "Catalytic decomposition of sulfur trioxide on the binary metal oxide catalysts of Fe/Al and Fe/Ti," *Applied Catalysis A: General*, 2006, pp. 39-45, vol. 305.

(Continued)

*Primary Examiner* — Melvin C Mayes
*Assistant Examiner* — Kenneth Vaden
(74) *Attorney, Agent, or Firm* — Oliff PLC

(57) ABSTRACT

A method for producing hydrogen from water is provided. The hydrogen production process includes splitting water into hydrogen and oxygen, wherein the process includes decomposing sulfuric acid into water, sulfur dioxide and oxygen through a reaction of formula (X1) by using solar thermal energy, wherein at least a part of the elementary reaction of formula (X1-1) is performed using thermal solar energy, and at least a part of the elementary reaction of formula (X1-2) is performed using additional thermal energy other than solar thermal energy, and wherein the heating temperature by the additional thermal energy is higher by 10° C. or more than the heating temperature by the solar thermal energy, and at least a part of the additional thermal energy is generated in a reaction vessel: (X1) $H_2SO_4 \rightarrow H_2O + SO_2 + 1/2 O_2$, (X1-1) $H_2SO_4 \rightarrow H_2O + SO_3$, and (X1-2) $SO_3 \rightarrow SO_2 + 1/2 O_2$.

10 Claims, 7 Drawing Sheets

(56) References Cited

OTHER PUBLICATIONS

Giaconia et al., "Hydrogen/methanol production by sulfur-iodine thermochemical cycle powered by combined solar/fossil energy," *International Journal of Hydrogen Energy*, 2007, pp. 469-481, vol. 32.

Tagawa et al., "Catalytic Decomposition of Sulfuric Acid Using Metal Oxides as the Oxygen Generating Reaction in Thermochemical Water Splitting Process," *International Journal of Hydrogen Energy*, 1989, pp. 11-17, vol. 14, No. 1.

\* cited by examiner

HYDROGEN PRODUCTION PROCESS

TECHNICAL FIELD

The present invention relates to a process for producing hydrogen, more specifically, a process for producing hydrogen from water.

BACKGROUND ART

In recent years, from the standpoint of global warming and the like, hydrogen is attracting attention as a clean energy involving no formation of carbon dioxide during combustion.

In general, for the production of hydrogen, steam reforming of a hydrocarbon fuel, represented by the following formulae (A1) and (A2), is employed:

$$C_nH_m + nH_2O \rightarrow nCO + (n+m/2)H_2 \quad (A1)$$

$$CO + H_2O \rightarrow CO_2 + H_2 \quad (A2)$$

Total reaction: $C_nH_m + 2nH_2O \rightarrow nCO_2 + (2n+m/2)H_2$

Accordingly, although carbon dioxide is not formed by the combustion itself of hydrogen, carbon dioxide is generally formed in the production of hydrogen.

In this connection, use of solar thermal energy or nuclear thermal energy has been proposed as the method for producing hydrogen without using a hydrocarbon fuel (see, Patent Document 1 and Non-Patent Document 1).

As the method for producing hydrogen from water by utilizing thermal energy, there has been proposed a method called an I—S (iodine-sulfur) cycle process represented by the following formulae (B1) to (B3):

$$H_2SO_4(\text{liquid}) \rightarrow H_2O(\text{gas}) + SO_2(\text{gas}) + 1/2O_2(\text{gas}) \quad (B1)$$

(reaction temperature=about 950° C., ΔH=188.8 kJ/mol-$H_2$)

$$I_2(\text{liquid}) + SO_2(\text{gas}) + 2H_2O(\text{liquid}) \rightarrow 2HI(\text{liquid}) + H_2SO_4(\text{liquid}) \quad (B2)$$

(reaction temperature=about 130° C., ΔH=−31.8 kJ/mol-$H_2$)

$$2HI(\text{liquid}) \rightarrow H_2(\text{gas}) + I_2(\text{gas}) \quad (B3)$$

(reaction temperature=about 400° C., ΔH=146.3 kJ/mol-$H_2$)

The total reaction of the I—S (iodine-sulfur) cycle process represented by formulae (B1) to (B3) is as follows:

$$H_2O \rightarrow H_2 + 1/2O_2$$

(ΔH=286.5 kJ/mol-$H_2$ (on the basis of higher heating value))

(ΔH=241.5 kJ/mol-$H_2$ (on the basis of lower heating value))

The reaction of formula (B1) can be divided into two elementary reactions of the following formulae (B1-1) and (B1-2):

$$H_2SO_4(\text{liquid}) \rightarrow H_2O(\text{gas}) + SO_3(\text{gas}) \quad (B1-1)$$

(reaction temperature=about 300° C., ΔH=90.9 kJ/mol-$H_2$)

$$SO_3(\text{gas}) \rightarrow SO_2(\text{gas}) + 1/2O_2(\text{gas}) \quad (B1-2)$$

(reaction temperature=about 950° C., ΔH=97.9 kJ/mol-$H_2$)

That is, in the case of producing hydrogen by an I—S cycle process, the sulfur trioxide ($SO_3$) decomposition reaction of formula (B1-2) requires a highest temperature, and the high temperature required in this reaction cannot be easily obtained.

Non-Patent Document 1 describes that, with respect to such a problem, a natural gas is burned as needed while using solar thermal energy as the heat source, and thereby additional thermal energy is obtained.

Also, in order to lower the temperature required in the sulfur trioxide decomposition reaction of formula (B1-2), use of a platinum catalyst has been proposed. It is known that a platinum catalyst may have high performance at the start of use in this reaction; however, the catalytic activity is reduced due to of oxdization of the platinum with oxygen produced in the reaction, and due to sintering of the platinum particle. Furthermore, the platinum catalyst is expensive, and therefore its use on an industrial scale is difficult.

In this connection, Non-Patent Document 2 has proposed a technique where, in order to lower the temperature required in the sulfur trioxide decomposition reaction, a catalyst selected from the group consisting of platinum (Pt), chromium (Cr), iron (Fe) and oxides thereof is used by depositing it on an alumina support.

In addition, with respect to the I—S cycle process, Patent Document 2 has proposed a technique where, in the reaction represented by formula (B2), that is, in the reaction of obtaining hydrogen iodide and sulfuric acid from iodine, sulfur dioxide and water, the reaction of sulfur dioxide with water is performed on the cathode side of a cation-exchange membrane, and the reaction of iodine is performed on the anode side of the cation-exchange membrane, and thereby the subsequent separation operation is omitted.

Incidentally, other than the I—S cycle process, a Westinghouse cycle process, an Ispra-Mark 13 cycle process and the like are known as the method for producing hydrogen by utilizing thermal energy. However, also in these processes, sulfur trioxide must be decomposed into sulfur dioxide and hydrogen as in formula (B1-2).

CITATION LIST

Patent Literature

[Patent Document 1] Japanese Unexamined Patent Publication No. 2007-218604
[Patent Document 2] Japanese Unexamined Patent Publication No. 2005-041764

Non-Patent Literature

[Non-Patent Document 1] A. Giaconia, et al., International Journal of Hydrogen Energy, 32, 469-481 (2007)
[Non-Patent Document 2] H. Tagawa, et al., International Journal of Hydrogen Energy, 14, 11-17 (1989)

SUMMARY OF INVENTION

Technical Problem

The present invention provides a process for producing hydrogen.

Solution to Problem

As a result of intensive studies, the present inventors have accomplished the present invention described below.
<1> A hydrogen production process comprising splitting water into hydrogen and oxygen, wherein the process comprises decomposing sulfuric acid into water, sulfur dioxide and oxygen through a reaction represented by the following formula (X1) by using solar thermal energy, the reaction represented by the following formula (X1) includes elementary reactions represented by the following formulae (X1-1) and (X1-2), at least a part of the elementary reaction of the following formula (X1-1) is performed using thermal solar energy, at least a part of the elementary reaction of the following formula (X1-2) is performed using additional thermal energy other than solar thermal energy, the heating temperature by the additional thermal energy is higher by 10° C. or more than the heating temperature by the solar thermal energy, and at least a part of the additional thermal energy is generated in a reaction vessel used for performing the elementary reactions of formula (X1-1) and/or formula (X1-2):

$$H_2SO_4 \rightarrow H_2O + SO_2 + 1/2 O_2 \quad (X1)$$

$$H_2SO_4 \rightarrow H_2O + SO_3 \quad (X1-1)$$

$$SO_3 \rightarrow SO_2 + 1/2 O_2 \quad (X1-2)$$

<2> The process as described in <1>above, wherein the additional thermal energy is provided by combustion of hydrogen and/or heating with an electric heater in the reaction vessel.

<3> The process as described in <2>above, wherein the additional thermal energy is provided by combustion of hydrogen in the reaction vessel.

<4> The process as described in <3>above, wherein the hydrogen is hydrogen obtained by splitting water into hydrogen and oxygen with use of solar thermal energy and/or solar light energy.

<5> The process as described in <2>above, wherein the additional thermal energy is provided by heating with an electric heater in the reaction vessel.

<6> The process as described in <5>above, wherein the electric power for the electric heater is electric power obtained from solar thermal energy and/or solar light energy.

<7> The hydrogen production process as described in any one of <1> to <6> above, wherein the reaction vessel is a flow-type reaction vessel and the solar thermal energy is supplied to the reaction vessel via a heat medium as a countercurrent to sulfuric acid supplied to the reaction vessel.

<8> The hydrogen production process as described in any one of <1> to <7> above, wherein the reaction vessel is a flow-type reaction vessel and at least a part of the additional thermal energy is generated downstream of the portion allowing the elementary reaction of formula (X1-2) to start.

<9> The hydrogen production process as described in any one of <1> to <8> above, wherein the reaction vessel is a flow-type reaction vessel and at least a part of the additional thermal energy is generated in a portion at 400° C. or more of the reaction vessel.

<10> The hydrogen production process as described in any one of <1> to <9> above, which is an I—S cycle process, a Westinghouse cycle process (sometimes referred to as a hybrid cycle process) or an Ispra-Mark 13 cycle process.

<11> The hydrogen production process as described in any one of <1> to <10> above, wherein the solar thermal energy is obtained by a parabolic dish-type light collector, a solar tower-type light collector, a parabolic trough-type light collector or a combination thereof.

<12> The hydrogen production process as described in any one of <1> to <11> above, wherein a sulfur trioxide decomposition catalyst selected from the group consisting of a transition metal, a typical metal, their oxides, and a combination thereof is disposed in the reaction vessel.

<13> The hydrogen production process as described in <12> above, wherein the sulfur trioxide decomposition catalyst contains a composite oxide of vanadium and at least one metal selected from the group consisting of transition metals and rare earth elements.

Effects of Invention

According to the hydrogen production process of the present invention, hydrogen can be produced from water with good energy efficiency regarding additional thermal energy other than solar thermal energy.

DESCRIPTION OF EMBODIMENTS

Figure 1:
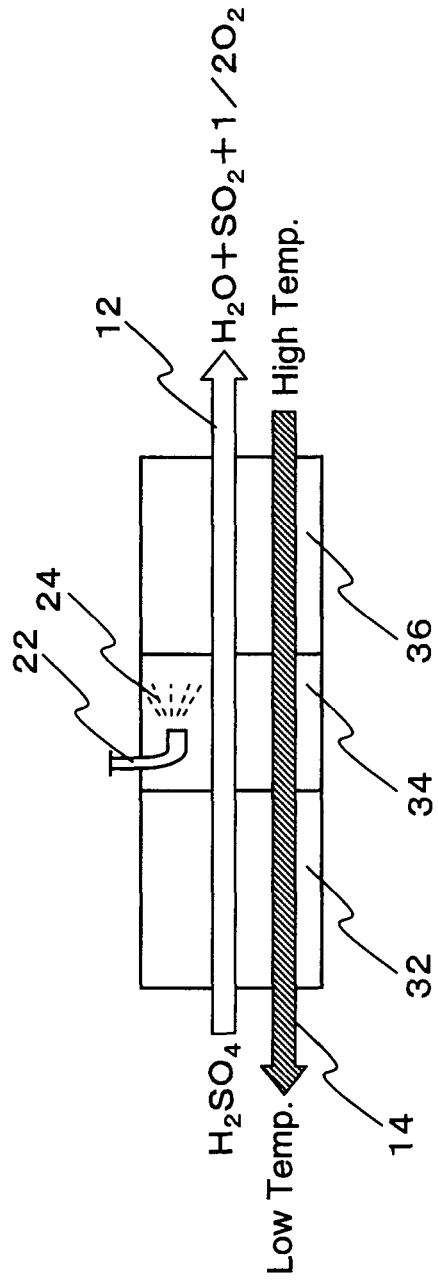
FIG. 1 is a view for explaining a first embodiment of the hydrogen production process of the present invention.

The hydrogen production process of the present invention comprises splitting water into hydrogen and oxygen.

This process comprises decomposing sulfuric acid into water, sulfur dioxide and oxygen through a reaction represented by the following formula (X1) by using solar thermal energy, and the reaction represented by the following formula (X1) includes the elementary reactions represented by the following formulae (X1-1) and (X1-2):

$$H_2SO_4 \rightarrow H_2O + SO_2 + 1/2 O_2 \quad (X1)$$

$$H_2SO_4 \rightarrow H_2O + SO_3 \quad (X1-1)$$

$$SO_3 \rightarrow SO_2 + 1/2 O_2 \quad (X1-2)$$

Also, in this process, at least a part of the elementary reaction of formula (X1-1) is performed using thermal solar energy, at least a part of the elementary reaction of formula (X1-2) is performed using additional thermal energy other than solar thermal energy, and the heating temperature by the additional thermal energy is higher by 10° C. or more, 50° C. or more, 100° C. or more, 150° C. or more, or 200° C. or more, than the heating temperature by the solar thermal energy.

In the elementary reaction of formula (X1-1), the ratio of the reaction performed using solar thermal energy may be 10% or more, 20% or more, 30% or more, 40% or more, 50% or more, 60% or more, 70% or more, 80% or more, 90% or more, or about 100%, based on the entire thermal energy absorbed by the reaction. The higher the above ratio is, the higher the ratio of solar thermal energy utilized in the hydrogen production process of the present invention becomes. Therefore, utilizing solar thermal energy with a higher ratio is generally preferred in view of energy efficiency regarding additional thermal energy.

Also, in the elementary reaction of formula (X1-2), the ratio of the reaction performed using additional thermal energy may be 10% or more, 20% or more, 30% or more, 40% or more, 50% or more, 60% or more, 70% or more, 80% or more, 90% or more, or about 100%, based on the entire thermal energy absorbed by the reaction. As described above, the heating temperature by the additional thermal energy is higher than the heating temperature by the solar thermal energy. Therefore, the higher ratio of the additional thermal energy utilized leads to that the elemental reaction of formula (X1-2) is performed at a relatively high temperature. Accordingly, the higher ratio of the additional thermal energy utilized is preferred in view of reaction rate, conversion ratio and the like of the elementary reaction of formula (X1-2). However, too high ratio of the additional thermal energy utilized leads to that the ratio of the additional thermal energy utilized in the hydrogen production process of the present invention is higher, that is, the ratio of the solar thermal energy utilized is lower, which is not preferred in view of energy efficiency regarding additional thermal energy.

As described above with respect to the hydrogen production process called an I—S (iodine-sulfur) cycle process, while the reaction energy (ΔH) of the elementary reaction of formula (X1-2) is 97.9 kJ/mol-$H_2$, the reaction energy (ΔH) of the total reaction of producing hydrogen from water is 241.5 kJ/mol-$H_2$ on the basis of lower heating value. That is, the reaction energy of the elementary reaction of formula (X1-2) is less than half of the reaction energy of the total reaction of producing hydrogen from water.

Therefore, for example, when all of the elementary reaction of formula (X1-1) is performed using solar thermal energy and all of the elementary reaction of formula (X1-2) is performed using additional thermal energy, the difference between the energy of hydrogen obtained and the energy of additional thermal energy required, that is, the energy obtained from solar thermal energy in the hydrogen production process of the present invention, becomes 143.6 kJ/mol-$H_2$ {i.e., (241.5 kJ/mol-$H_2$)−(97.9 kJ/mol-$H_2$)}. This means that about 59% {i.e., (143.6 kJ/mol-$H_2$)/(241.5 kJ/mol-$H_2$)} of the reaction energy of the total reaction of producing hydrogen from water is obtained from solar thermal energy.

Also, for example, when all of the elementary reaction of formula (X1-1) is performed using solar thermal energy and half of the elementary reaction of formula (X1-2) is performed using additional thermal energy, the difference between the energy of hydrogen obtained and the energy of additional thermal energy required, that is, the energy obtained from solar thermal energy in the hydrogen production process of the present invention, becomes 169.7 kJ/mol-$H_2$ {i.e., (241.5 kJ/mol-$H_2$)−(97.9 kJ/mol-$H_2$)/2}. This means that about 70% {i.e., (169.7 kJ/mol-$H_2$)/(241.5 kJ/mol-$H_2$)} of the reaction energy of the total reaction of producing hydrogen from water is obtained from solar thermal energy.

Incidentally, the energy calculation above is based on heat of reaction according to a simple reaction formula. However the heat loss may occur, and individual reaction rate may not reach 100% in the actual plant. Accordingly, the ratio of reaction energy obtained from solar thermal energy to the total reaction energy may not necessarily coincide with the value above.

(Solar Thermal Energy)

The solar thermal energy can be supplied to the reaction vessel in any manner.

For example, when the reaction vessel where the reaction of formula (X1) is performed is a flow-type reaction vessel, the solar thermal energy can be supplied to the reaction vessel by a heat medium such as molten metal and molten metal salt as a countercurrent to sulfuric acid supplied to the reaction vessel. In this case, the temperature on the outlet side of the flow-type reaction vessel, that is, the side where the elementary reaction represented by formula (X1-2) is proceeding, can be made higher and the temperature on the inlet side of the flow-type reaction vessel, that is, the side where the elementary reaction represented by formula (X1-1) occurs, can be made lower. Since the temperature on the side where the elementary reaction represented by formula (X1-2) which needs higher temperature occurs, can be made higher, the solar thermal energy can be utilized efficiently.

As for the light collector to obtain the solar thermal energy, a parabolic dish-type light collector, a solar tower-type light collector and a parabolic trough-type light collector are known. Among these, a parabolic trough-type light collector is preferred, because the structure is simple, the cost is low, and the collector is suitable for a large-scale plant.

(Additional Thermal Energy)

The additional thermal energy can be supplied using any heat source having a higher temperature than the heating temperature supplied by the solar thermal energy.

At least a part of the additional thermal energy, for example, 30% or more, 50% or more, 70% or more, 90% or more, or about 100% of the additional thermal energy, is at least partially generated in the reaction vessel where the elementary reactions of formula (X1-1) and/or formula (X1-2) are performed. In this case, the additional thermal energy can be efficiently utilized for the elementary reactions of formula (X1-1) and/or formula (X1-2). On the other hand, in the case of supplying the additional thermal energy from outside the reaction vessel, since the elementary reactions of formula (X1-1) and/or formula (X1-2) are an endothermic reaction, the temperature is low in the central portion of the reaction vessel, and in turn, the reaction rate in the central portion of the reaction vessel is reduced.

For example, when the reaction vessel is a flow-type reaction vessel, at least a part of the additional thermal energy can be generated downstream of the portion where the elementary reaction of formula (X1-2) is started. Furthermore, when the reaction vessel is a flow-type reaction vessel, at least a part of the additional thermal energy can be generated in a portion having a temperature of 400° C. or more, 500° C. or more, or 600° C. or more, of the reaction vessel. According to these embodiments, the final conversion ratio can be efficiently increased by raising the temperature in a portion where the elementary reaction of formula (X1-2) has proceeded to a certain extent.

The additional thermal energy can be provided, for example, by combustion of hydrogen and/or heating with an electric heater in the reaction vessel.

(Additional Thermal Energy—Combustion of Hydrogen)

In the case of providing the additional thermal energy by combustion of hydrogen in the reaction vessel, hydrogen is supplied into the reaction vessel where the elementary reactions of formula (X1-1) and/or formula (X1-2) are performed, and the hydrogen is burned in the reaction vessel, and thereby heat of combustion can be provided.

Burning hydrogen in the reaction vessel is preferred in that hydrogen and water produced by combustion have no adverse effect on the elementary reactions of formula (X1-1) and/or formula (X1-2). Also, addition of hydrogen is preferred in that, in the equilibrium relationship represented by the following formula (X1-2'), the equilibrium is shifted to the sulfur trioxide decomposition side, that is, the sulfur dioxide production side:

$$H_2O+SO_3+nH_2 \leftarrow \rightarrow (1+n)H_2O+SO_2+(1-n)/2O_2 \qquad (X1\text{-}2')$$

Figure 4:
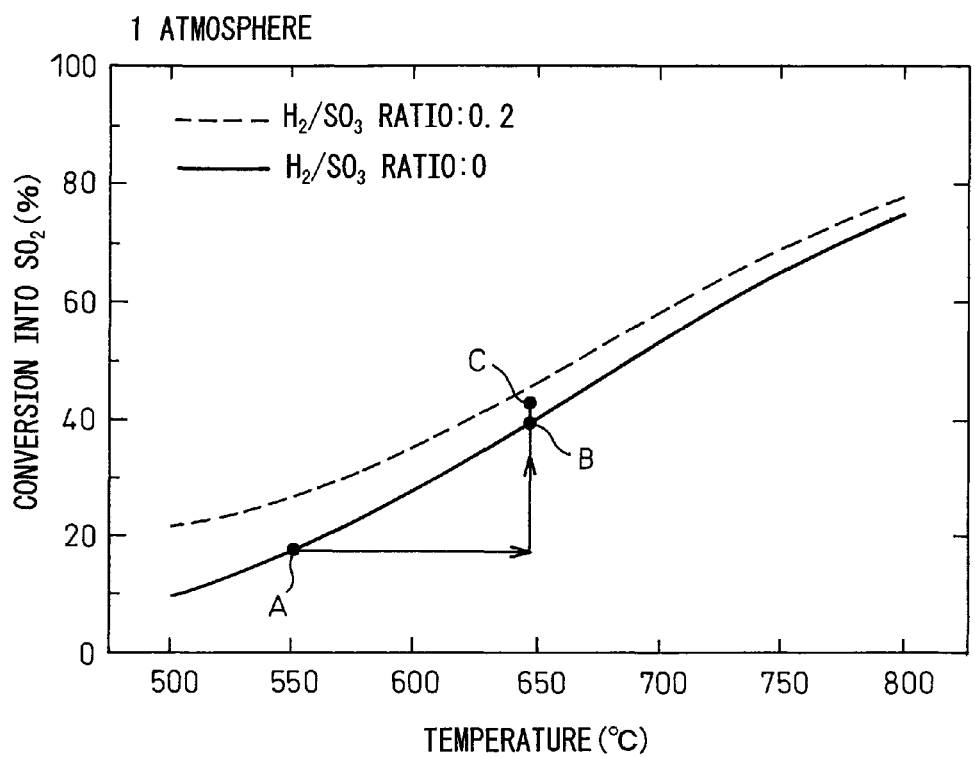
FIG. 4 is a view showing the effects of temperature and hydrogen on the conversion ratio in the reaction represented by formula (B1-2), that is, the conversion ratio in the reaction of decomposing sulfur trioxide to obtain sulfur dioxide and oxygen.

Shifting of equilibrium by the addition of hydrogen to the elementary reaction of formula (X1-2) can be shown, for example, in FIG. 4. In FIG. 4, the lower solid line indicates the relationship between temperature and equilibrium conversion ratio in the case where hydrogen is not added, and the upper dashed line indicates the relationship between temperature and equilibrium conversion ratio in the case where the ratio of hydrogen to sulfur trioxide ($H_2/SO_3$) is 0.2.

As understood from FIG. 4, in both the case where hydrogen is added and the case where hydrogen is not added, the equilibrium conversion ratio from sulfur trioxide ($SO_3$) to sulfur dioxide ($SO_2$) is increased with rise of the temperature. Also, when the temperature is constant, the equilibrium conversion ratio from sulfur trioxide ($SO_3$) to sulfur dioxide ($SO_2$) is larger in the case where hydrogen is added.

Accordingly, for example, when the ratio of hydrogen to sulfur trioxide ($H_2/SO_3$) is 0.13 and the temperature is raised from 550° C. to 650° C. by combustion of hydrogen, the equilibrium is shifted from point A to point B due to the rise of reaction temperature from 550° C. to 650° C., and the equilibrium is further shifted from point B to point C due to the change in the ratio of hydrogen from 0 to 0.2, as shown in FIG. 4.

Specifically, for example, when only the reaction temperature is elevated from 550° C. to 650° C., the equilibrium conversion ratio is increased by 23.11%. When the ratio of hydrogen is set to 0.13 and the temperature is elevated from 550° C. to 650° C., the equilibrium conversion ratio is further improved by 4.40% and increased by 27.51% in total (that is, 23.11%+4.40%).

The ratio of hydrogen to sulfur trioxide ($H_2/SO_3$) can be optionally determined according to the desired reaction temperature, final conversion ratio and the like, and may be, for example, 0.01 or more, 0.05 or more, or 0.10 or more, and 0.3 or less, or 0.2 or less.

The hydrogen provided to the reaction vessel may be hydrogen obtained by splitting water into hydrogen and oxygen with use of solar thermal energy and/or solar light energy. This is preferred in that carbon dioxide is not formed or is relatively little formed in the production of hydrogen provided to the reaction vessel.

Figure 2:
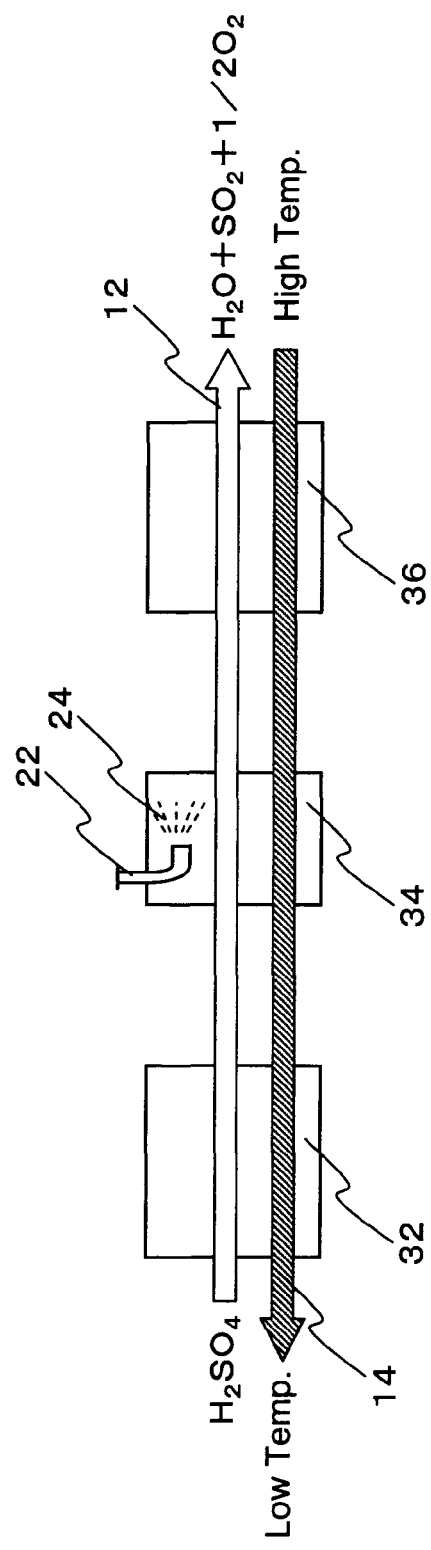
FIG. 2 is a view for explaining a second embodiment of the hydrogen production process of the present invention.

In the case of providing the additional thermal energy by combustion of hydrogen in the reaction vessel, the reaction vessel for use in the hydrogen production process of the present invention may be, for example, a reaction vessel as shown in FIG. 1 or 2.

In the flow-type reaction vessel shown in FIG. 1, sulfuric acid ($H_2SO_4$) as a raw material of the reaction of formula (X1) is passed through the flow-type reaction vessel (32, 34, 36) as shown by the arrow (12). Also, solar thermal energy is supplied to the reaction vessel via a heat medium as a countercurrent to the sulfuric acid supplied to the reaction vessel, as shown by the arrow (14). Furthermore, hydrogen (24) is added to the reaction vessel from a hydrogen adding apparatus (22).

The flow-type reaction vessel shown in FIG. 1 is divided into an upstream part (32) where the reaction of formula (X1-1) is performed, a midstream part (34) where hydrogen is added, and a downstream part (36) where the reaction of formula (X1-2) is performed, but these portions (32, 34, 36) need not be distinctly segmented. Conversely, as shown in FIG. 2, in the flow-type reaction vessel, these portions (32, 34, 36) may be individually disposed as an independent reaction vessel, and the independent reaction vessels may be connected through a conduit.

(Additional Thermal Energy—Heating with Electric Heater)

In the case of providing the additional thermal energy by heating with an electric heater in the reaction vessel, any electric heater usable for heating in the reaction vessel can be used. That is, in the case where heating with an electric heater as a heat source is used, the electric heater is disposed in the reaction vessel where the elementary reactions of formula (X1-1) and/or formula (X1-2) are performed, and the electric heater is energized, and thereby heating can be performed in the reaction vessel.

The electric power for the electric heater may be electric power obtained from solar thermal energy and/or solar light energy. This is preferred in that carbon dioxide is not formed or is relatively little formed in the production of electric power for the electric heater.

Figure 3:
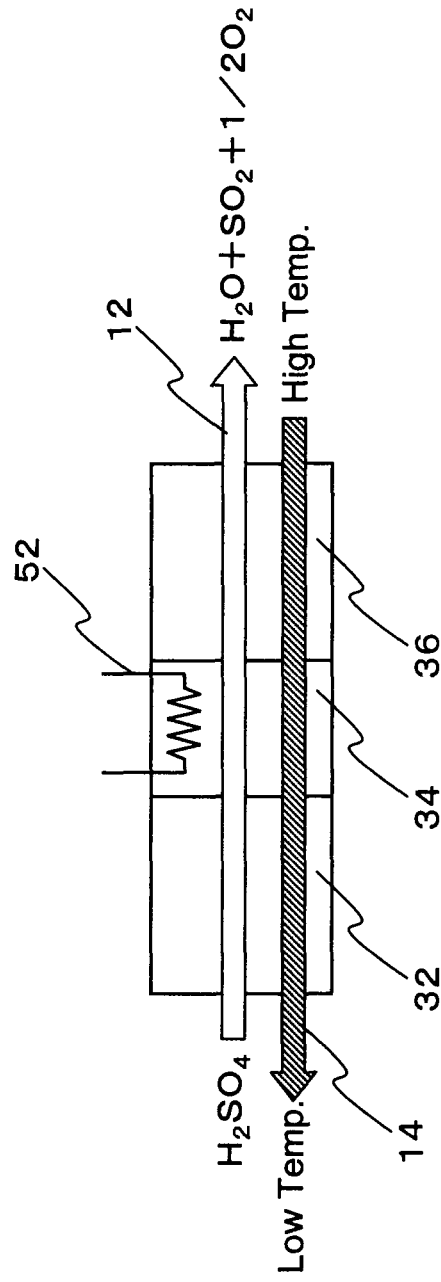
FIG. 3 is a view for explaining a third embodiment of the hydrogen production process of the present invention.

In the case of providing the additional thermal energy by heating with an electric heater in the reaction vessel, the reaction vessel used for the hydrogen production process of the present invention may be, for example, a reaction vessel as shown in FIG. 3.

In the flow-type reaction vessel shown in FIG. 3, sulfuric acid ($H_2SO_4$) as a raw material of the reaction of formula (X1) is passed through the flow-type reaction vessel (32, 34, 36) from left to right in the Figure as shown by the arrow (12). Also, solar thermal energy is supplied to the reaction vessel via a heat medium as a countercurrent to the sulfuric acid supplied to the reaction vessel, as shown by the arrow (14). Furthermore, an electric heater (52) is disposed in the reaction vessel.

The flow-type reaction vessel shown in FIG. 3 is divided into an upstream part (32) where the reaction of formula (X1-1) is performed, a midstream part (34) where the heating is performed by an electric heater (52), and a downstream part (36) where the reaction of formula (X1-2) is performed, but these portions (32, 34, 36) need not be distinctly segmented. Conversely, as shown in FIG. 2 for the embodiment of adding hydrogen, in the flow-type reaction vessel, these portions (32, 34, 36) may be individually disposed as an independent reaction vessel, and the independent reaction vessels may be connected through a conduit.

(Hydrogen Production Cycle)

The hydrogen production process of the present invention which comprises splitting water into hydrogen and oxygen by using solar thermal energy, comprises decomposing sulfuric acid into water, sulfur dioxide and oxygen through a reaction represented by the following formula (X1):

$$H_2SO_4 \rightarrow H_2O+SO_2+1/2O_2 \qquad (X1)$$

The hydrogen production process of the present invention may be, for example, an I—S cycle process, a Westinghouse cycle process or an Ispra-Mark 13 cycle process.

That is, for example, the hydrogen production process of the present invention may be an I—S (iodine-sulfur) cycle process represented by the following formulae (X1) to (X3):

$$H_2SO_4 \rightarrow H_2O+SO_2+1/2O_2 \qquad (X1)$$

$$I_2+SO_2+2H_2O \rightarrow 2HI+H_2SO_4 \qquad (X2)$$

$$2HI \rightarrow H_2+I_2 \qquad (X3)$$

Total reaction: $H_2O \rightarrow H_2 + 1/2O_2$

Also, for example, the hydrogen production process of the present invention may be a Westinghouse cycle process represented by the following formulae (X1), (X4) and (X5):

$$H_2SO_4 \rightarrow H_2O + SO_2 + 1/2O_2 \quad (X1)$$

$$SO_2 + 2H_2O \rightarrow H_2SO_3 \quad (X4)$$

$$H_2SO_3 + H_2O + \rightarrow H_2 + H_2SO_4 \text{(electrolysis)} \quad (X5)$$

Total reaction: $H_2O \rightarrow H_2 + 1/2O_2$

Furthermore, for example, the hydrogen production process of the present invention may be an Ispra-Mark 13 cycle process represented by the following formulae (X1), (X6) and (X7):

$$H_2SO_4 \rightarrow H_2O + SO_2 + 1/2O_2 \quad (X1)$$

$$2HBr \rightarrow Br_2 + H_2 \quad (X6)$$

$$Br_2 + SO_2 + 2H_2O + \rightarrow 2HBr + H_2SO_4 \quad (X7)$$

Total reaction: $H_2O \rightarrow H_2 + 1/2O_2$ (Sulfur Trioxide Decomposition Catalyst)

In the hydrogen production process of the present invention, a sulfur trioxide decomposition catalyst can be used in the reaction vessel in order to lower the temperature required for the sulfur trioxide decomposition reaction of formula (B1-2) to make the sulfur trioxide decomposition reaction proceed at a substantive rate at a temperature of, for example, about 700° C. or less.

The sulfur trioxide decomposition catalyst contains, for example, a composite oxide of vanadium and at least one metal selected from the group consisting of transition metals and rare earth elements.

As described above, in the conventional process of decomposing sulfur trioxide, a temperature close to 1,000° C. is generally employed. However, the material capable of withstanding such a high temperature is very limited, and moreover, fairly expensive.

Also, the high temperature close to 1,000° C. can be hardly obtained at a low cost from on the solar energy. More specifically, for example, as the light collector for obtaining solar thermal energy, a parabolic dish-type light collector, a solar tower-type light collector and a parabolic trough-type light collector are known. Among them, the parabolic trough-type light collector has a simple structure and is small in cost and suitable for a large-scale plant; however, it is unrealistic for the parabolic trough-type light collector to collect solar energy at a high temperature close to 1,000° C. due to balance between collection of solar energy and dissipation of energy by radiation.

Accordingly, it has very great industrial value to lower the temperature required for the sulfur trioxide decomposition reaction by using a sulfur trioxide decomposition catalyst, and to make the sulfur trioxide decomposition reaction proceed at a substantive rate at a temperature of, for example, about 700° C. or less.

(Sulfur Trioxide Decomposition Catalyst—Composite Oxide)

The sulfur trioxide decomposition catalyst contains, for example, a composite oxide of vanadium and at least one metal selected from the group consisting of transition metals and rare earth elements. As for the transition metal and rare earth element constituting the composite oxide, any transition metals or rare earth elements, for example, a metal selected from the group consisting of copper (Cu), chromium (Cr), titanium (Ti), zirconium (Zr), lanthanum (La), cerium (Ce), neodymium (Nd) and a combination thereof, may be used.

In the composite oxide of the sulfur trioxide decomposition catalyst, the atom ratio between vanadium and at least one metal selected from the group consisting of transition metals and rare earth elements (at least one metal such as transition metal : vanadium) may be from 1:9 to 9:1, from 2:8 to 8:2, from 3:7 to 7:3, or from 4:6 to 6:4.

The composite oxide of the sulfur trioxide decomposition catalyst can be obtained by any method.

For example, the composite oxide may be obtained by mixing individual metal oxides constituting the composite oxide, and firing the mixture. Also, in the case of selecting a salt of a transition metal element or the like and a vanadium salt so as to enable coprecipitation thereof, the composite oxide can be obtained by coprecipitating a precursor of the composite oxide from an aqueous solution containing a salt of a transition metal element or the like and a vanadium salt, and then firing the obtained coprecipitate.

Furthermore, when the sulfur trioxide decomposition catalyst is a supported catalyst where the composite oxide is supported on a support, the sulfur trioxide decomposition catalyst can be obtained by a process in which the support is caused to absorb an aqueous solution containing a salt of a transition metal element or rare earth element, dried and calcined; caused to absorb an aqueous solution of a vanadium salt, dried and calcined; and then fired. Conversely, the sulfur trioxide decomposition catalyst can be obtained by a process in which the support is caused to first absorb an aqueous solution of a vanadium salt, dried and calcined; caused to absorb an aqueous solution containing a salt of a transition metal element or the like, dried and calcined; and then fired. Also, in the case of selecting a vanadium salt and a salt of a transition metal element or the like so as to enable coprecipitation thereof, the sulfur trioxide decomposition catalyst can be obtained by a process in which the support is caused to absorb an aqueous solution containing both a vanadium salt and a salt of a transition metal element or the like, dried and calcined; and then fired.

(Sulfur Trioxide Decomposition Catalyst—Support)

The composite oxide of the sulfur trioxide decomposition catalyst can be supported on a support to increase the surface area of the composite oxide and reduce the decrease in the surface area of the composite oxide during use of it. In this connection, the usable support includes a support selected from the group consisting of silica, alumina, zirconia, titania and a combination thereof.

Accordingly, for example, silica, particularly, a porous silica support having a pore structure, can be used as the support. In this case, the composite oxide is preferably supported inside the pore structure of the porous silica support. Also, in this case, the porous silica support preferably has a pore distribution such that the peak attributable to a gap between primary particles of silica is present in the range of a pore size of 5 to 50 nm, particularly a pore size of 5 to 30 nm, and the peak attributable to the pore structure inside the silica particle is present in the range of a pore size of 1 to 5 nm, particularly a pore size of 2 to 4 nm.

In the case of using a porous silica support having a pore structure in this way, the composite oxide can be supported near the surface of the pore structure of the porous silica support, and thereby sintering of the composite oxide particle can be suppressed. Although not being bound by a theory, it is considered that, by the composite oxide particle maintained in such a very fine state, not only the surface area of the catalyst increases about 100 times due to microparticulation of the catalyst, but also the property of the catalyst surface is sometimes changed to improve the catalyst performance of the composite oxide.

Furthermore, it is considered that in the pore distribution of the porous silica particle having a pore structure, a binary distribution of pores is created, and thereby a vapor-phase gas having a high diffusion speed is supplied at a high speed from pores with a pore size of ten to several tens of nm to active sites having a wide surface area and a pore size of several nm This increases the chance of bringing the composite oxide particle into contact with sulfur trioxide, as a result, the catalyst performance is improved.

Incidentally, the porous silica support having a pore structure can be obtained by the method described in Japanese Unexamined Patent Publication No. 2008-12382.

The reaction of decomposing sulfur trioxide into sulfur dioxide and oxygen by using a sulfur trioxide decomposition catalyst can be performed at a lower temperature than in the conventional method of decomposing sulfur trioxide, for example, at a temperature of 800° C. or less, 750° C. or less, 700° C. or less, or 650° C. or less.

EXAMPLES

In the following Examples, the catalyst usable in the hydrogen production process of the present invention is evaluated.

Example 1

In this Example, a composite metal oxide (Cu—V—O) of copper (Cu) and vanadium (V) was used as the catalyst.
(Production of Unsupported Catalyst)

Figure 5:
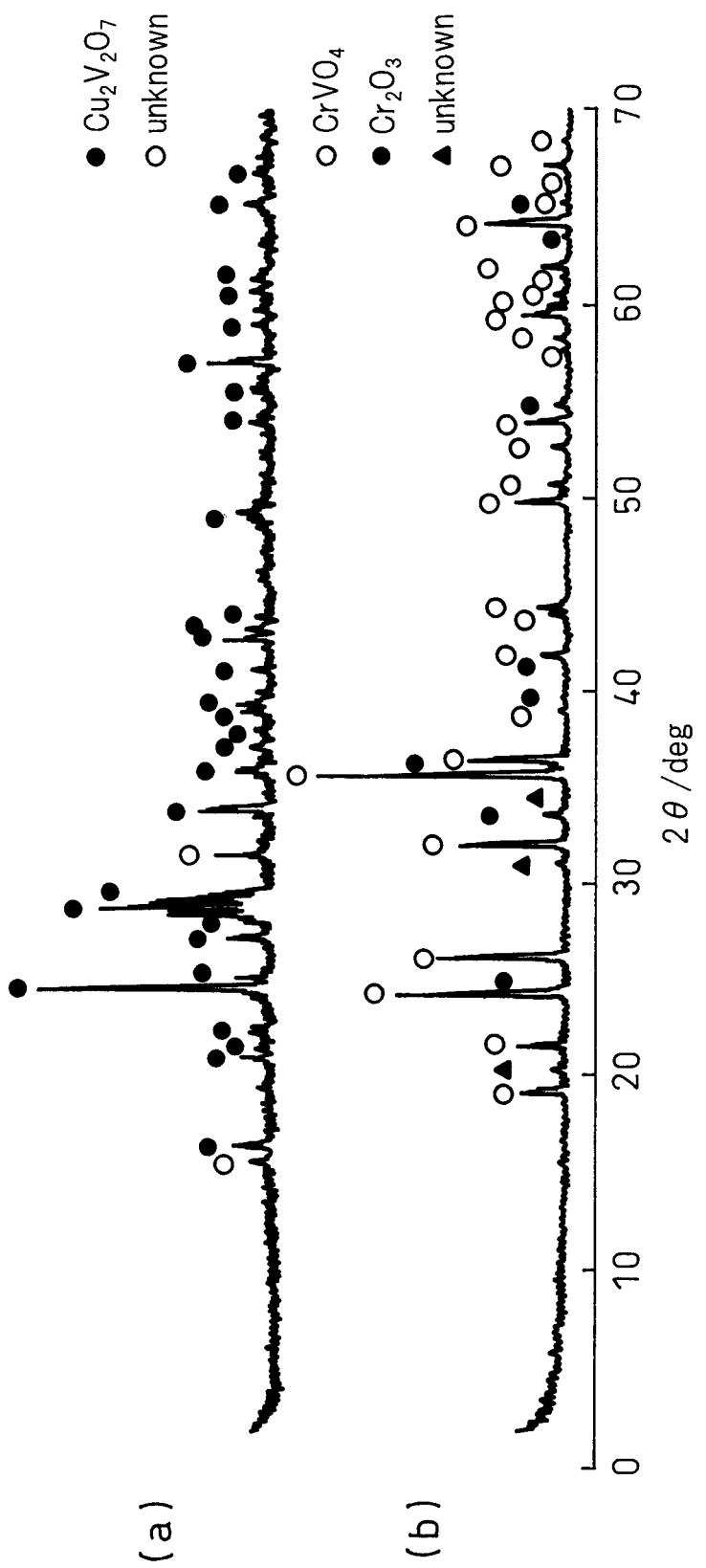
FIG. 5 is a view showing the results of X-ray diffraction analysis on a composite metal oxide used as an unsupported catalyst in (a) Example 1 and (b) Example 2.

Copper oxide and vanadium oxide in an atom ratio of respective metals of 1:1 were ground in a mortar, the ground oxides were well-mixed, and the mixture was charged into an alumina-made crucible and fired at 750° C. over 12 hours, and thereby the unsupported catalyst used as the catalyst was obtained. FIG. 5(a) shows the X-ray diffraction analysis (XRD) results of the obtained unsupported catalyst.
(Production of Supported Catalyst)

A supported catalyst where a composite metal oxide is supported on a porous silica support having a pore structure was produced as follows.
(Production of Supported Catalyst—Production of Porous Silica Support)

The porous silica support for the supported catalyst was produced by the method similar to the method described in Japanese Unexamined Patent Publication No. 2008-12382. That is, the porous silica support was produced as follows.

In 6 L (liter) of distilled water, 1 kg of cetyltrimethylammonium chloride was dissolved. The obtained aqueous solution was stirred for 2 hours to self-align the cetyltrimethylammonium chloride. Tetraethoxysilane and aqueous ammonia were then added to the solution containing the self-aligned cetyltrimethylammonium chloride to adjust the pH of the solution to 9.5.

In this solution, tetraethoxysilane was hydrolyzed for 30 hours to precipitate silica around aligned hexadecylamine, and thereby a secondary particle composed of a primary particle having nanosize pores was formed, and thus a porous silica support precursor was obtained.

Thereafter, the obtained porous silica support precursor was washed with aqueous ethanol, filtered, dried and fired in an air at 800° C. for 2 hours to obtain a porous silica support.

The porous silica support obtained here had pores of around 2.7 nm attributable to the pore structure of silica and pores of over 10 nm attributable to the gap between primary particles of silica.

(Production of Supported Catalyst—Loading of Composite Metal Oxide)

The composite oxide was loaded on the porous silica by a water absorption loading method. Specifically, first, copper nitrate was dissolved in water to prepare an aqueous solution, and the support was caused to absorb the aqueous solution, dried at 150° C. and calcined at 350° C. for 1 hour. Ammonium metavanadate was then dissolved in water, and the support was caused to absorb the resulting aqueous solution, dried at 150° C. and calcined at 350° C. for 1 hour. Finally, the obtained support was fired at 600° C. for 2 hours to obtain a composite oxide-supported porous silica support.

The amount of copper supported was 0.12 mol/100 g-support, and the amount of vanadium supported was 0.12 mol/100 g-support.

Example 2

In Example 2, a composite metal oxide (Cr—V—O) of chromium (Cr) and vanadium (V) was used as the catalyst. An unsupported catalyst was produced in the same procedure as in Example 1 except that the firing temperature was 700° C. in the production of the unsupported catalyst.

FIG. 5(b) shows the X-ray diffraction analysis (XRD) results of the obtained unsupported catalyst.

Example 3

In Example 3, a composite metal oxide (Ce—V—O) of cerium (Ce) and vanadium (V) was used as the catalyst.

An unsupported catalyst and a supported catalyst were produced in the same procedure as in Example 1 except that the firing temperature was 700° C. in the production of the unsupported catalyst.

Figure 6:
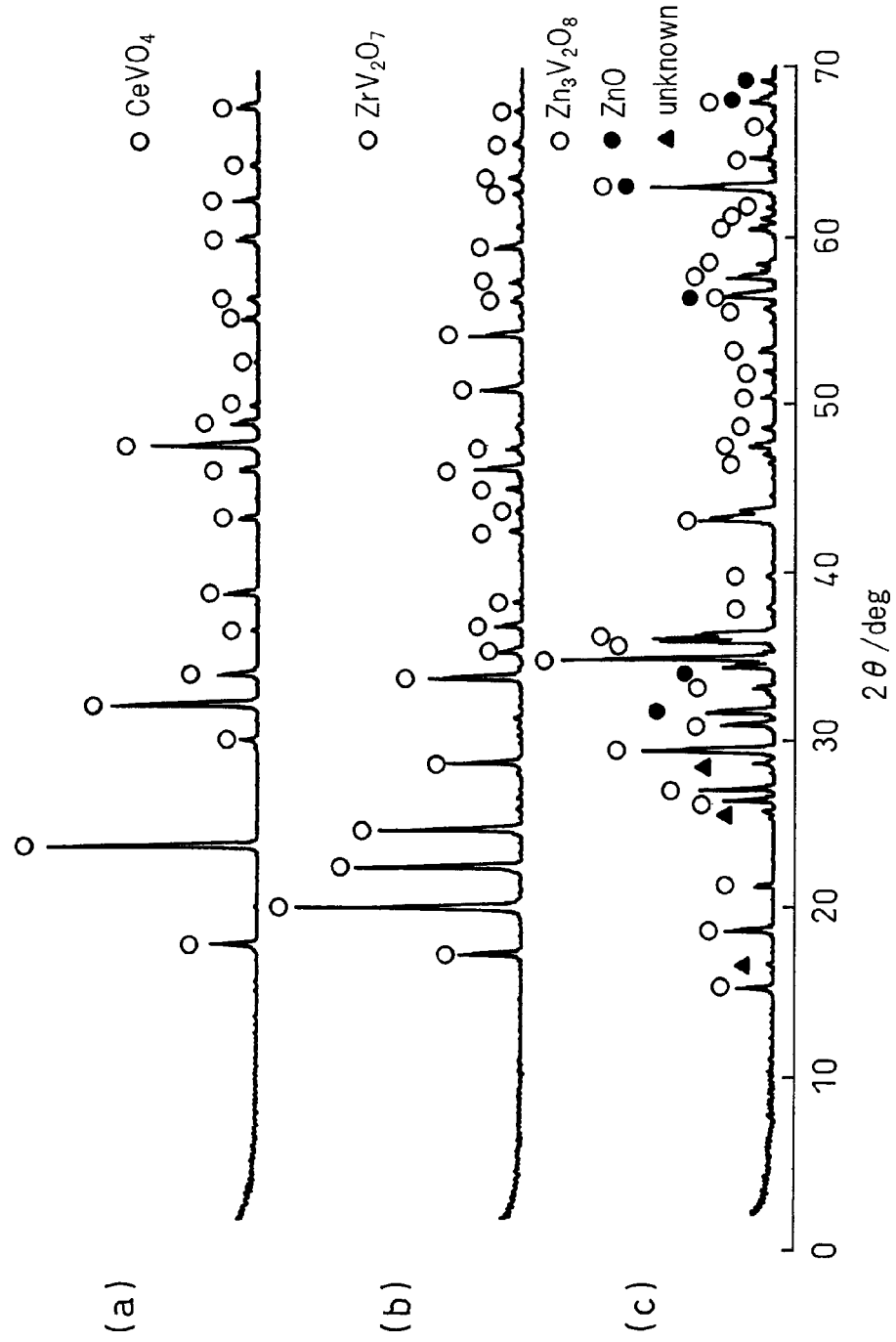
FIG. 6 is a view showing the results of X-ray diffraction analysis on a composite metal oxide used as an unsupported catalyst in (a) Example 3, (b) Example 4 and (c) Comparative Example 1.

FIG. 6(a) shows the X-ray diffraction analysis (XRD) results of the obtained unsupported catalyst.

Example 4

In Example 4, a composite metal oxide (Zr—V—O) of zirconium (Zr) and vanadium (V) was used as the catalyst. An unsupported catalyst was produced in the same procedure as in Example 1 except that the firing temperature was 700° C. in the production of the unsupported catalyst.

FIG. 6(b) shows the X-ray diffraction analysis (XRD) results of the obtained unsupported catalyst.

Example 5

In Example 5, a composite metal oxide (Ti—V—O) of titanium (Ti) and vanadium (V) was used as the catalyst. An unsupported catalyst was produced in the same procedure as in Example 1 except that the firing temperature was 600° C. in the production of the unsupported catalyst.

Example 6

In Example 6, a composite metal oxide (La—V—O) of lanthanum (La) and vanadium (V) was used as the catalyst. A supported catalyst was produced in the same procedure as in Example 1.

Example 7

In Example 7, a composite metal oxide (Nd—V—O) of neodymium (Nd) and vanadium (V) was used as the catalyst. A supported catalyst was produced in the same procedure as in Example 1.

Comparative Example 1

In Comparative Example 1, a composite metal oxide (Zn—V—O) of zinc (Zn) and vanadium (V) was used as the catalyst. An unsupported catalyst was produced in the same procedure as in Example 1 except that the firing temperature was 700° C. in the production of the unsupported catalyst.

FIG. 6(c) shows the X-ray diffraction analysis (XRD) results of the obtained unsupported catalyst.

Comparative Example 2

In Comparative Example 2, an oxide (Cr—O) of chromium (Cr) was used as the catalyst. An unsupported catalyst and a supported catalyst were produced in the same procedure as in Example 1 except that firing for forming a composite oxide was not performed in the production of the unsupported catalyst and the amount of chromium supported was 0.24 mol/100 g-support in the production of the supported catalyst.

Comparative Example 3

In Comparative Example 3, an oxide (Fe—O) of iron (Fe) was used as the catalyst. An unsupported catalyst and a supported catalyst were produced in the same procedure as in Example 1 except that firing for forming a composite oxide was not performed in the production of the unsupported catalyst and the amount of iron supported was 0.24 mol/100 g-support in the production of the supported catalyst.

Comparative Example 4

In Comparative Example 4, an oxide (Cu—O) of copper (Cu) was used as the catalyst. An unsupported catalyst was produced in the same procedure as in Example 1 except that firing for forming a composite oxide was not performed in the production of the unsupported catalyst.

Comparative Example 5

In Comparative Example 5, an oxide (V—O) of vanadium (V) was used as the catalyst. An unsupported catalyst was produced in the same procedure as in Example 1 except that firing for forming a composite oxide was not performed in the production of the unsupported catalyst.

Comparative Example 6

In Comparative Example 6, an oxide (Ni—O) of nickel (Ni) was used as the catalyst. An unsupported catalyst was produced in the same procedure as in Example 1 except that firing for forming a composite oxide was not performed in the production of the unsupported catalyst.

Comparative Example 7

In Comparative Example 7, an oxide (Co—O) of cobalt (Co) was used as the catalyst. An unsupported catalyst was produced in the same procedure as in Example 1 except that firing for forming a composite oxide was not performed in the production of the unsupported catalyst.

Comparative Example 8

In Comparative Example 8, a catalyst was not used.

Reference Example

In Reference Example, platinum was loaded on a γ-alumina support to produce a supported catalyst. The amount of Pt supported was 0.5g/100g-support.

(Evaluation)

Figure 7:
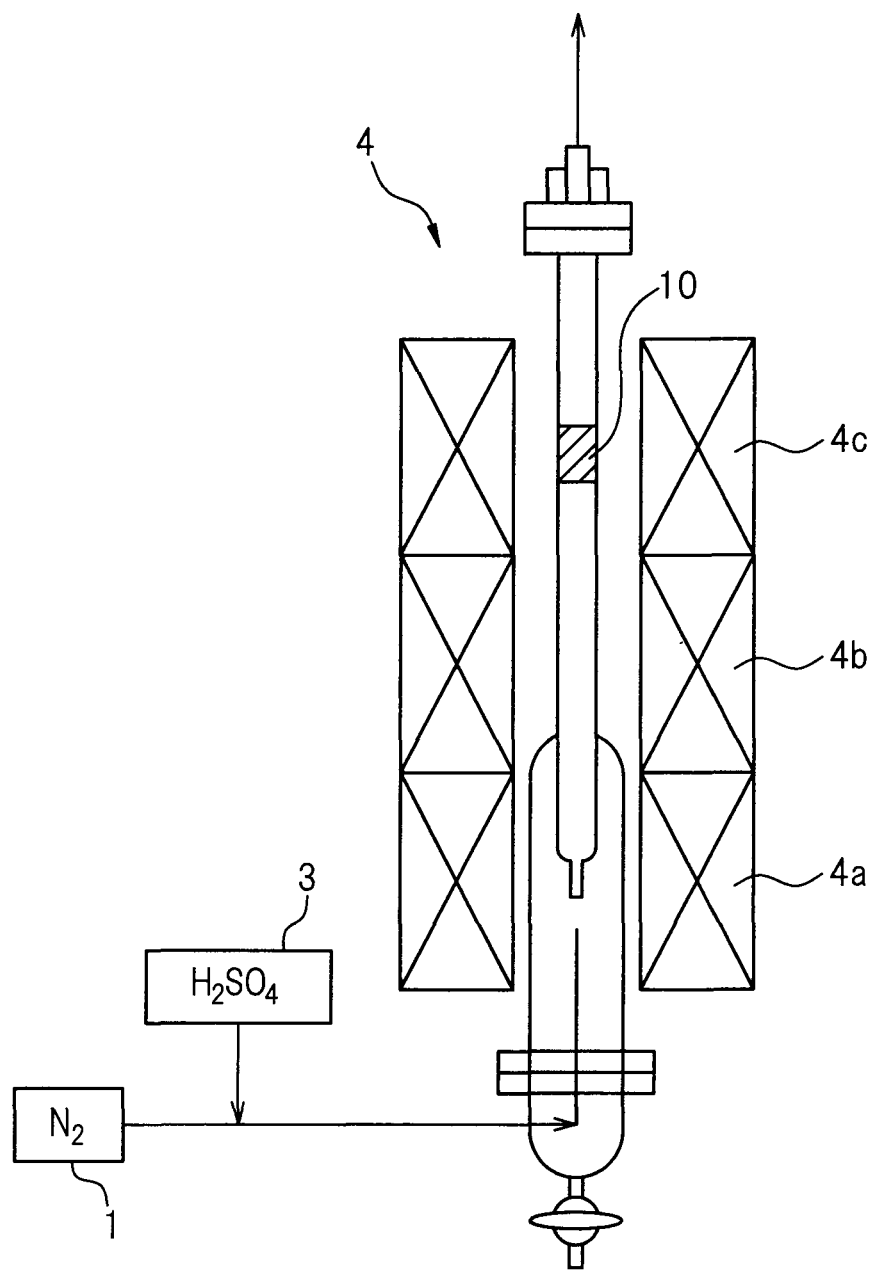
FIG. 7 is a view showing an apparatus used for evaluating the sulfur trioxide decomposition catalysts of Examples, Comparative Examples and Reference Example.

The unsupported catalysts and supported catalysts of Examples, Comparative Examples and Reference Example were evaluated for the conversion ratio of sulfur trioxide decomposition reaction of the following formula (X1-2) by using a fixed bed flow reactor shown in FIG. 7:

$$SO_3 \rightarrow SO_2 + 1/2 O_2 \quad (X1\text{-}2)$$

Specifically, the conversion ratio of the sulfur trioxide decomposition reaction was evaluated as described below by referring to FIG. 7.

A quartz-made reaction tube 4 (inner diameter: 10 mm) was filled with, as a catalyst bed 10, 0.5 g an unsupported catalyst or supported catalyst adjusted to 14 to 20 meshes. Nitrogen ($N_2$) (100 mL/min) and a 47 wt % sulfuric acid ($H_2SO_4$) aqueous solution (50 μL/min) were supplied to the lower stage of the quartz-made reaction tube 4 from a nitrogen supply part 1 and a sulfuric acid supply part 3, respectively.

The sulfuric acid ($H_2SO_4$) supplied to the lower stage of the quartz-made reaction tube 4 was heated in the lower and middle stages of the quartz-made reaction tube 4 to decompose into sulfur trioxide ($SO_3$) and oxygen ($O_2$) and flowed into the catalyst bed 10 ($SO_3$:4.5 mol %, $H_2O$:31 mol %, $N_2$: balance, gas flow rate in terms of 0° C.: 148.5 $cm^3$/min, weight-flow ratio (W/F ratio): $5.61 \times 10^{-5}$ g·h/$cm^3$, gas hourly space velocity (GHSV): about 15,000 $h^{-1}$).

In the quartz-made reaction tube 4, the lower stage was heated to about 400° C. by a heater 4a, and the middle stage was heated to about 600° C. by a heater 4b. Also, the upper stage of the quartz-made reaction tube 4 was initially heated to about 600° C. by a heater 4c, and heated to 650° C. after reaching to the stationary state.

After the upper stage of the quartz-made reaction tube 4 was heated to 650° C. by the heater 4c, the outflow gas from the quartz-made reaction tube 4 was air-cooled and then bubbled through a 0.05 M iodine ($I_2$) solution, and sulfur dioxide ($SO_2$) was absorbed in the iodine solution. The amount of sulfur dioxide absorbed was determined by performing iodometric titration of the iodine solution which had absorbed sulfur dioxide with a 0.025 M sodium thiosulfate ($Na_2S_2O_3$) solution.

Also, the outflow gas after bubbling through the iodine solution was cooled with a dry ice/ethanol mixture, and the remaining sulfur dioxide and sulfur trioxide were completely removed with a mist absorber and silica gel. Thereafter, the amount of oxygen ($O_2$) was determined by using a magnetic pressure oxygen analyzer (MPA3000, manufactured by Horiba Ltd.) and a gas chromatograph (GC8A, manufactured by Shimadzu Corporation, molecular sieve 5A, TCD detector).

The conversion ratio from sulfur trioxide ($SO_3$) to sulfur dioxide ($SO_2$) was calculated from the amounts of sulfur dioxide and oxygen determined as above.

Evaluation results of Examples, Comparative Examples and Reference Example are shown in Table 1 below.

TABLE 1

| Catalyst | | Conversion Ratio | |
| --- | --- | --- | --- |
| | | Without Support (%) | With Support (SiO$_2$) (%) |
| Example 1 | Cu—V—O | 51.7 | 93.6 |
| Example 2 | Cr—V—O | 45.9 | — |
| Example 3 | Ce—V—O | 26.9 | 67.9 |
| Example 4 | Zr—V—O | 39.3 | — |
| Example 5 | Ti—V—O | 67.2 | — |
| Example 6 | La—V—O | — | 80.0 |
| Example 7 | Nd—V—O | — | 93.6 |
| Comparative Example 1 | Zn—V—O | 9.8 | — |
| Comparative Example 2 | Cr—O | 40.5 | 53.3 |
| Comparative Example 3 | Fe—O | 25.9 | 32.4 |
| Comparative Example 4 | Cu—O | 6.2 | — |
| Comparative Example 5 | V—O | 22.3 | — |
| Comparative Example 6 | Ni—O | (no conversion) | — |
| Comparative Example 7 | Co—O | (no conversion) | — |
| Comparative Example 8 | none | (no conversion) | — |
| Reference Example 1 | Pt | — | 84.3 (γ-alumina support) |

It is understood from Table 1 that the catalysts of Examples have significantly preferred sulfur trioxide decomposition characteristics at a relatively low temperature of 650° C., compared with the catalysts of Comparative Examples. Also, it is understood from Table 1 that the catalysts of Examples using no noble metal have sulfur trioxide decomposition characteristics equal to or higher than those of the catalyst of Reference Example using platinum that is a noble metal.

Incidentally, vanadium oxide, particularly vanadium pentoxide (V$_2$O$_5$), used in Comparative Example 5 was employed for accelerating the reaction of formula (C-2) of decomposing sulfur dioxide to obtain sulfur trioxide in the method called a contact process of producing sulfuric acid through reactions represented by the following formulae (C-1) to (C-3):

$$S(solid)+O_2(gas) \rightarrow SO_2(gas) \quad (C\text{-}1)$$

$$2SO_2(gas)+O_2(gas) \rightarrow 2SO_3(gas) \quad (C\text{-}2)$$

$$SO_3(gas)+H_2O(liquid) \rightarrow H_2SO_4(liquid) \quad (C\text{-}3)$$

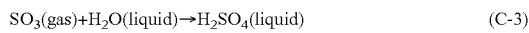

However, in Comparative Example 5 using vanadium oxide, the conversion ratio was significantly low compared with Examples.

Reference Signs List

1 Nitrogen supply part

3 Sulfuric acid supply part

4 Quartz-made reaction tube 4a, 4b, 4c Heater

10 Catalyst bed

22 Hydrogen adding apparatus

24 Hydrogen 32, 34, 36 Flow-type reaction vessel

52 Electric heater

The invention claimed is:

1. A hydrogen production process comprising splitting water into hydrogen and oxygen, wherein
the process comprises decomposing sulfuric acid into water, sulfur dioxide and oxygen through a reaction represented by the following formula (X1) by using solar thermal energy,
the reaction represented by the following formula (X1) includes elementary reactions represented by the following formulae (X1-1) and (X1-2),
at least a part of the elementary reaction of the following formula (X1-1) is performed using thermal solar energy,
at least a part of the elementary reaction of the following formula (X1-2) is performed using additional thermal energy provided by combustion of hydrogen added in a reaction vessel used for performing the elementary reactions of formula (X1-1) and /or formula (X1-2), and the equilibrium of reaction represented by the following formula (X1-2) is shifted to the sulfur dioxide production side by reaction of the remaining added hydrogen after the combustion, and oxygen generated by conversion of SO$_3$ to SO$_2$, and wherein
the heating temperature by said additional thermal energy is higher by 10° C. or more than the heating temperature by the solar thermal energy, and
at least a part of said additional thermal energy is generated in the reaction vessel used for performing the elementary reactions of formula (X1-1) and/or formula (X1-2), and the reaction of the remaining added hydrogen after the combustion and the oxygen generated by conversion of SO$_3$ to SO$_2$ occurs in the reaction vessel used for performing the elementary reaction of formula (X1-2):

$$H_2SO_4 \rightarrow H_2O+SO_2+1/2O_2 \quad (X1)$$

$$H_2SO_4 \rightarrow H_2O+SO_3 \quad (X1\text{-}1)$$

$$SO_3 \rightarrow SO_2+1/2O_2 \quad (X1\text{-}2).$$

2. The process according to claim 1, wherein said additional thermal energy is further provided by heating with electric heater in said reaction vessel.

3. The process according to claim 2, wherein the electric power for said electric heater is electric power obtained from solar thermal energy and/or solar light energy.

4. The process according to claim 1, wherein said added hydrogen is hydrogen obtained by splitting water into hydrogen and oxygen with use of solar thermal energy and/or solar light energy.

5. The process according to claim 1, wherein said reaction vessel is a flow-type reaction vessel and said solar thermal energy is supplied to said reaction vessel via a heat medium as a countercurrent to sulfuric acid supplied to said reaction vessel.

6. The process according to claim 1, wherein said reaction vessel is a flow-type reaction vessel and at least a part of said additional thermal energy is generated downstream of the portion at which said elementary reaction of formula(X1-2) starts.

7. The process according to claim 1, wherein said reaction vessel is a flow-type reaction vessel and at least a part of said additional thermal energy is generated in a portion of said reaction vessel having a temperature of 400° C. or more.

8. The process according to claim 1, wherein the process is an I-S cycle process, a Westinghouse cycle process or an Ispra-Mark 13 cycle process.

9. The process according to claim 1, wherein said solar thermal energy is obtained by a parabolic dish-type light collector, a solar tower-type light collector, a parabolic trough-type light collector or a combination thereof.

10. The process according to claim 1, wherein a sulfur trioxide decomposition catalyst containing a composite oxide of vanadium and at least one metal selected from the group consisting of transition metals and rare earth elements is disposed in said reaction vessel.

* * * * *